Nov. 4, 1969     E. E. HESTON     3,475,788
EXTRUDER
Filed March 28, 1968
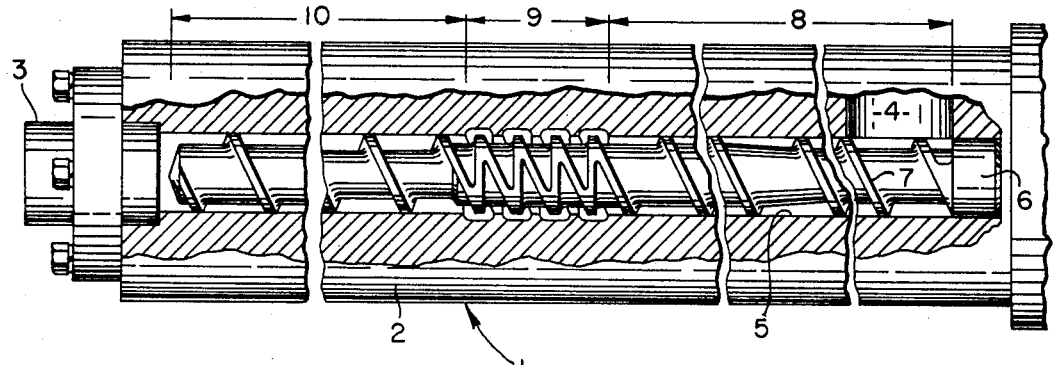
*Fig. 1*
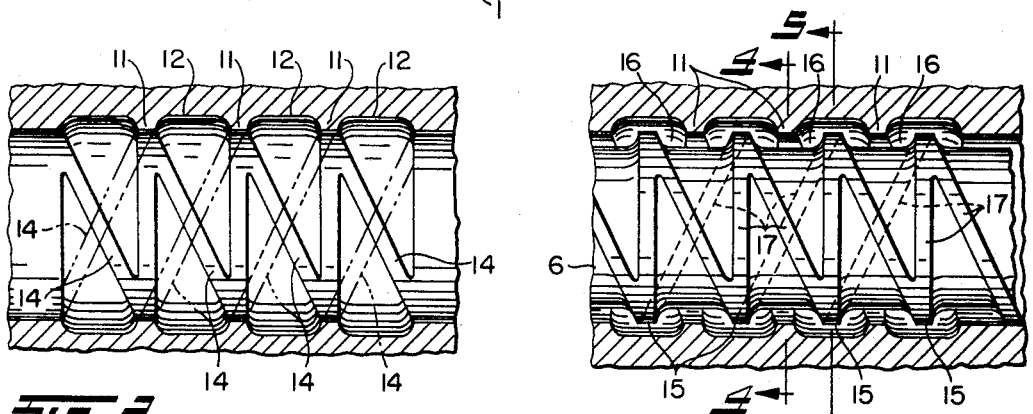
*Fig. 2*     *Fig. 3*
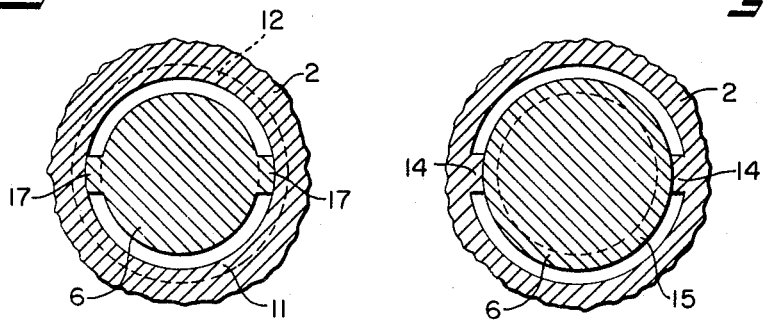
*Fig. 4*     *Fig. 5*
INVENTOR
EUGENE E. HESTON
BY
*Oberlin, Maky, Donnelly & Renner*
ATTORNEYS United States Patent Office 3,475,788
Patented Nov. 4, 1969

3,475,788
EXTRUDER
Eugene E. Heston, Akron, Ohio, assignor to NRM Corporation, Akron, Ohio, a corporation of Ohio
Filed Mar. 28, 1968, Ser. No. 716,871
Int. Cl. B29f 3/02
U.S. Cl. 18—12                                    14 Claims

ABSTRACT OF THE DISCLOSURE

Extruder having a mixing section whereat the body of material being worked upon is subjected to thorough mixing by shearing action and material transfer between screw and cylinder channels but without severe crushing or masticating action.

BACKGROUND OF THE INVENTION

It is known, of course, to provide a mixing zone in an extruder which, for example, as disclosed in the patent to Magerkurth 2,765,491, comprises generally axially extending ribs on the screw operative to turn the body of material which is being fed through the extruder thus to knead, mix, mill, blend, and tumble the material, this action being increased by providing a fluted cylinder bore in the mixing zone.

It is also known to provide mixing in an extruder by causing flow of material through a restricted passage in the extruder as, for example, as disclosed in the patents to Heston 2,595,455, Mallory et al. 2,970,341, Heston 3,-158,900, and Lacher 3,271,819.

Yet another known way of providing for mixing of plasticized material during the course of its flow through an extruder is disclosed in the patent to Magerkurth 2,-639,464, wherein both cylinder bore and the feed screw are provided with threads arranged to induce a counter-flow of the portion of the plastic material that rotates within the cylinder for blending and mixing with the material flowing in the opposite direction under the influence of the feed screw threads.

SUMMARY OF THE INVENTION

Contrary to the aforementioned schemes for obtaining mixing of plastic material during the course of its movement through an extruder, it is contemplated in the present invention to provide for improved mixing action by providing staggered circular ribs on the feed screw and in the cylinder bore, the ribs of the feed screw and of the cylinder bore respectively being joined by helical ribs of opposite hand, whereby rotating shear zones are provided between the ribs of the feed screw where disposed in close proximity to the threads of the cylinder, and the ribs in the cylinder where disposed in close proximity to the threads of the feed screw.

Accordingly, the material is alternately sheared and is caused to flow from the feed screw channels into the cylinder channels to obtain a thorough mixing and blending action without severe crushing or masticating.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWING

FIG. 1 is a longitudinal cross-setcion view of an extruder embodying the present invention;
FIG. 2 is a fragmentary cross-section of the mixing zone portion of the cylinder alone on enlarged scale;
FIG. 3 is similar to FIG. 2 except that the mixing zone portion of the feed screw has been added; and
FIGS. 4 and 5 are transverse cross-section views as viewed along the respective lines 4—4 and 5—5 of FIG. 3.

DESCRIPTION OF THE PREFERRED EMBODIMENT

Referring first to FIG. 1 of the drawing, the reference numeral 1 denotes the cylinder assembly of an extruder which comprises a cylinder 2 having an extrusion die 3 mounted at one end thereof, and having a feed opening 4 for plastic material adjacent the other end. Rotatable in the cylinder bore 5 as by suitable drive means, not shown, is a feed screw 6 having a helical rib 7 thereon which, when the feed screw is rotated in the direction indicated by the arrow, longitudinally advances material in the cylinder 2 from the feed opening 4 toward the extrusion die 3, the material being worked upon and heated and compressed during the course of such movement.

As well known in the art, the section 8 of the extruder may appropriately be termed as the feed-compression-metering section from which the material will pass into the mixing section 9. From the mixing section 9 the mixed and blended material will be fed toward the extrusion die 3 through a second feed-compression-metering section 10.

Referring now in addition to FIGS. 2 to 5 which illustrate the mixing section 9 on enlarged scale, the cylinder 2 is formed with a plurality of axially spaced apart circular ribs 11 defining annular channels or grooves 12 therebetween, the channels 12 being sub-divided into wedge shaped channels by a double internal thread 14 which, in this case, is shown as a left-hand thread.

On the other hand, the mixing section of the feed screw 6 has a plurality of axially spaced apart circular ribs 15 which are axially offset from the ribs 11 in the cylinder 2, said ribs 15 defining annular grooves 16 therebetween which are subdivided into wedge shaped channels by the helical ribs 17 of a double thread which in this case, is a right-hand thread.

It can be seen from FIGS. 3 and 4 that each circular rib 11 in the cylinder 2 is in close proximity to diametrically opposite portions of the respective helical ribs 17 on the feed screw 6.

Similarly, as best shown in FIGS. 3 and 5, each circular rib 15 on the feed screw 6 is in close proximity to diametrically opposite portions of the respective helical ribs 14 in the cylinder 2.

As the screw 6 turns, the material in the aforesaid wedged shaped pockets or channels 16 tends to be turned with the screw 6, but by reason of the pressure feed of the material from the feed-compression-metering section 8 there will be tendency of material which is turning to flow over the ribs 17 into the wedge-shaped pockets or channels 12 in the cylinder 2 and, in turn, the material which turns in the channels 12 in the cylinder 2 tends to be advanced toward the extrusion die 3 but again, the wedge-shaped channels 12 in the cylinder 2 tend to arrest turning of the material, whereby material crosses over the circular ribs 11 in the cylinder 2. In this way, and because of the aforesaid shearing zones which turn in FIG. 4 with respect to the threads 14 and which are stationary in FIG. 5, while the threads 17 turn, the material is continuously being sheared and transferred from the feed screw channels 16 to the cylinder channels 12 and vice versa, so that by the time the material reaches the end of the mixing section 9 it is thoroughly mixed and blended and ready for final feeding through the second stage 10 and out through the extrusion die 3.

Since the mixing section 9 of this invention does not produce "screw lines," it will be appreciated that such mixing section may be located at the discharge end of the screw. This may be important where such "screw lines" are developed by the flights of the screw in the second section 10.

Although the present invention has been illustrated herein in conjunction with a two-stage plastic extruder, it is to be understood that the extruder herein may be used simply as a mixer for rubber and rubber-like materials. For example, particles or granules of devulcanized rubber, oils, and chemicals in liquid or finely divided powder or pellet form may be fed through the feed opening 4 toward the discharge end of the cylinder assembly 1. In such use the particles are compacted and subjected to thorough mixing action in the mixing section 9, whereby a well mixed rubber compound may be continuously discharged at a high rate of production.

Other modes of applying the principle of the invention may be employed, change being made as regards the details described, provided the features stated in any of the following claims, or the equivalent of such, be employed.

I therefore particularly point out and distinctly claim as my invention:

1. An extruder for plastic and like material comprising a cylinder having feed and discharge openings at its respective ends; and a feed screw rotatable in said cylinder to advance material from said feed opening toward said discharge opening; said cylinder and feed screw defining a mixing section between said openings; said feed screw in the mixing section thereof having a circular rib therearound and an adjacent helical rib defining a wedge-shaped channel; and said cylinder in the mixing section thereof being internally grooved to leave a circular rib and an adjoining helical rib defining a wedge-shaped channel which is axially offset with respect to said feed screw channel whereby material spanning said channels is mixed by shearing action of said circular and helical ribs.

2. The extruder of claim 1 wherein said helical ribs are of opposite hand.

3. The extruder of claim 1 wherein the helical rib of said feed screw is a continuation of the material feeding rib thereof.

4. The extruder of claim 1 wherein the helical rib of said feed screw is a continuation of the material feeding rib thereof; and wherein the helical rib in said cylinder is of hand opposite to the helical rib of said feed screw.

5. An extruder for plastic and like material comprising a cylinder having feed and discharge openings at its respective ends; and a feed screw rotatable in said cylinder to advance material from said feed opening toward said discharge opening; said cylinder and feed screw defining a mixing section between said openings; said feed screw in the mixing section thereof having a plurality of axially spaced apart circular ribs therearound and a plurality of helical ribs crossing said circular ribs and defining with the latter wedge shaped channels; and said cylinder in the mixing section thereof being internally grooved to leave a plurality of axially spaced apart circular ribs and a plurality of helical ribs crossing said circular ribs and defining with the latter wedge shaped channels in said cylinder which are axially offset with respect to said feed screw channels whereby material spanning said channels is mixed by shearing action of said circular and helical ribs.

6. The extruder of claim 5 wherein the helical ribs in said cylinder are of hand opposite to those of said feed screw.

7. The extruder of claim 5 wherein one of the helical ribs of said feed screw is a continuation of the material feeding rib thereof.

8. The extruder of claim 5 wherein one of the helical ribs of said feed screw is a continuation of the material feeding rib thereof; and wherein the helical ribs in said cylinder are of hand opposite to those of said feed screw.

9. A screw type extruder having a mixing section between its ends which comprises axially offset circular ribs of approximately equal diameters on the screw and in the cylinder respectively, said ribs having wedge-shaped channels thereadjacent whereby rotation of said screw effects a shearing-mixing action on plastic material flowing from the screw channel of the cylinder channel.

10. The extruder of claim 9 wherein said channels are defined by helical ribs which merge with the respective circular ribs.

11. The extruder of claim 10 wherein the helical rib in said cylinder is of hand opposite to the helical rib on said screw.

12. A screw type extruder having a mixing section between its ends which comprises plural axially spaced apart circular ribs on the screw and in the cylinder respectively, the ribs on said screw being axially offset from the ribs in said cylinder in alternating relation, said ribs having wedge-shaped channels thereadjacent whereby rotation of said screw effects a shearing-mixing action on plastic material flowing from the screw channels to the cylinder channels and vice versa.

13. The extruder of claim 12 wherein said channels are defined by helical ribs which merge with the respective circular ribs.

14. The extruder of claim 13 wherein the helical ribs in said cylinder are of hand opposite to the helical ribs on said screw.

References Cited

UNITED STATES PATENTS

| | | |
|---|---|---|
| 2,970,341 | 2/1961 | Mallory et al. |
| 3,164,563 | 1/1965 | Maxwell et al. |
| 3,382,536 | 5/1968 | Fritsch et al. |

FOREIGN PATENTS

| | | |
|---|---|---|
| 653,172 | 2/1963 | Italy. |

WILLIAM J. STEPHENSON, Primary Examiner